Aug. 29, 1933.  E. G. GUNN  1,925,073
VIBRATION DAMPER FOR CRANK SHAFTS
Original Filed June 10, 1929
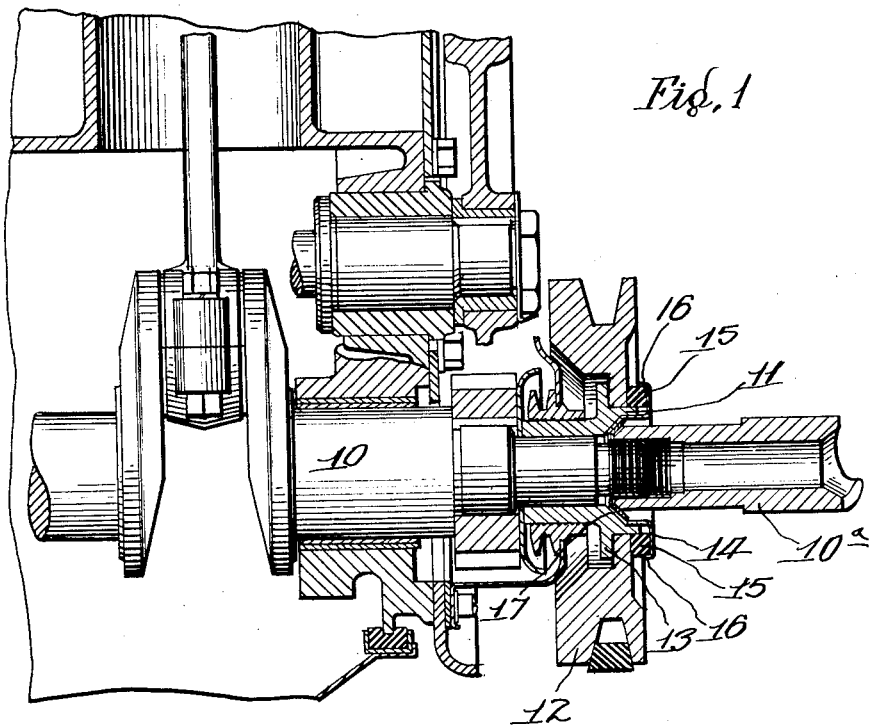
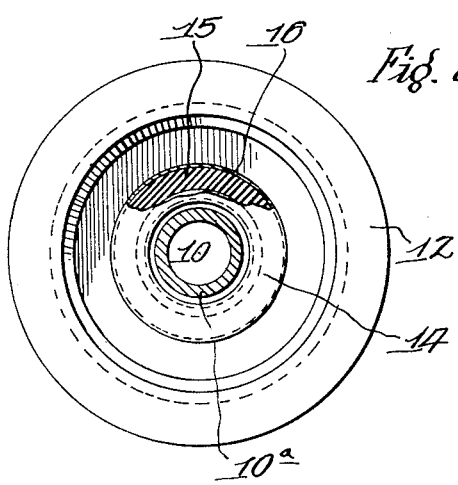
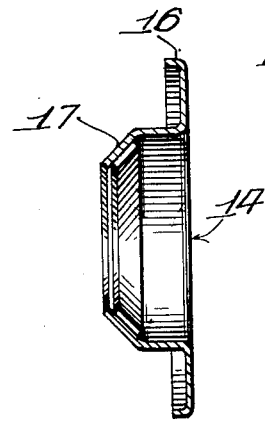
Inventor
Earl G. Gunn
Offield Melhope Scott & Poole
Attorneys Patented Aug. 29, 1933

1,925,073

UNITED STATES PATENT OFFICE 1,925,073

VIBRATION DAMPER FOR CRANK SHAFTS

Earl G. Gunn, Detroit, Mich., assignor, by mesne assignments, to Packard Motor Car Company, Detroit, Mich., a corporation of Michigan Application June 10, 1929, Serial No. 369,762
Renewed September 15, 1932

6 Claims. (Cl. 74—6)

This invention relates to improvements in vibration dampers for crank shafts of internal combustion motors, and has for its principal object to provide an improved construction for devices of the character described.

Various constructions have been heretofore proposed and utilized for yieldingly mounting an inertia member or flywheel on a crank shaft in order to minimize the effect of excessive vibrations at certain speeds, usually ascribed to coupling of natural periods of vibration of certain moving parts of the motor.

In a copending application, bearing Serial No. 369,761, and filed June 10, 1929, I have disclosed one form of damper in which a plurality of studs with intervening rubber discs are employed for yieldingly securing the flywheel to its hub. In the device of the present invention I provide an improved and simplified construction wherein the parts are secured together by a single retaining member and an interposed rubber ring, as will hereinafter more fully appear.

The invention may best be understood by reference to the accompanying drawing, in which Figure 1 is a fragmentary sectional view of a motor taken axially of the crank shaft, to which crank shaft my invention has been applied, Figure 2 is a front view of the crank shaft and flywheel mounted thereon, with parts broken away, Figure 3 is an enlarged detail section of the retaining ring.

Referring to details of the embodiment of my invention illustrated in the drawing, a crank shaft is indicated at 10, and is provided with a hub 11 on which a flywheel 12 is yieldably mounted to permit limited rotation of said flywheel relative to said crank shaft.

In the form shown, the flywheel 12 has a bearing on one side against a flanged portion 13 of the hub, and is secured to the hub by a metallic annular member 14 secured to the hub in clamping engagement with a rubber ring 15 which engages the opposite side of said flywheel to hold it in frictional engagement with said flange 13, and to compress the rubber to an appreciable extent. The annular member 14 is preferably drawn from a single piece of metal, and is provided with an inwardly extending marginal flange 16 which engages the outer periphery of the rubber ring 15, as shown.

Any suitable means may be provided for securing said annular member to the hub, in the form shown said member having a central cupped portion 17 which is wedged against said hub by a sleeve 10a which herein is the starting crank connection, threaded on the end of crank shaft 10, as shown.

The construction above described provides a particularly simple and economical arrangement for the intended purpose. The rubber ring affords relatively great deflection under initial and small loads, while the resistance increases more rapidly under heavier loads than is the case with the usual tension materials which follow Hooke's law. The response of the device to high frequency torsional vibrations is appreciably increased by the initial compression of the rubber ring and this initial compression furthermore serves to augment the dissipation of energy by frictional contact between the rubber ring and the cooperating elements which serve to clamp the same. In this manner the dissipation of energy by deflection of the ring as well as by friction between the parts is sufficient to satisfactorily damp high frequency vibration.

Although I have illustrated and described the particular embodiment of my invention, it will be understood that I do not wish to be limited to the exact construction shown and described, but that various changes and modifications may be made without departing from the spirit and scope of my invention.

I claim as my invention:

1. A vibration damper comprising a crank shaft having a hub member, a flywheel member, and means clamping said members together in an axial direction including a concentric annular retaining ring rigidly and directly secured to one of said members, and a concentric annular rubber insert interposed under compression between said ring and the other of said members, and permitting limited rotation of said members relative to each other, whereby said rubber insert will be subjected to shearing action on relative vibrational movement of said members.

2. A vibration damper comprising a crank shaft having a hub member, a flywheel member, and means clamping said members together in an axial direction including a concentric annular retaining ring rigidly and directly secured to said hub member and extending outwardly of the inner margin of said flywheel member, and a rubber insert interposed under compression between said ring and said flywheel member and permitting limited rotation of said members relative to each other, whereby said rubber insert will be subjected to shearing action on relative vibrational movement of said members.

3. A vibration damper for a crank shaft comprising a hub member secured to the shaft and having a flange, an inertia member journaled on said hub and in frictional engagement with said flange, a rubber member surrounding said hub member and in frictional engagement with the inertia member, and means rigidly and directly secured to said hub member axially compressing the rubber member against the inertia member to increase the friction of said inertia member with the rubber member and with the flange.

4. A vibration damper for a crank shaft comprising a hub secured to the shaft and having a flange, an inertia member movable relatively to said hub in frictional contact with said flange, a retaining member rigidly and directly secured to the hub, and a rubber insert interposed under compression between the retaining member and the inertia member and in frictional contact with said inertia member to increase the friction between the inertia member and the flange and to resiliently resist relative motion therebetween.

5. In a vibration damper for a crankshaft, the combination with a member carried by the shaft, said member having an axially extending bearing surface, of an inertia member journalled for rotation on said bearing surface, said inertia member having a radially extending portion contacting with said shaft carried member, and means associated with said shaft carried member and said inertia member and deformable in response to relative movement of the latter about the shaft axis, said means being mounted on said bearing surface and being under compression axially of the shaft and reacting against said members to increase the contact pressure therebetween.

6. In a vibration damper for a crankshaft, the combination with a member carried by the shaft, said member being provided with an axially extending bearing surface, of an inertia member journalled for rotation on said bearing, one of said members being provided with a flange portion having radially extending faces on opposite sides thereof, radially extending flanges respectively opposing the faces on the said flange portion of the last named member and carried by the other of said members, and deformable means mounted on said bearing surface and under compression between one of said radially extending flanges and the opposed radially extending face of the said flange portion for applying contact pressure between the opposite radially extending face and the opposing flange, whereby relative movement of said members about the crankshaft is opposed by the resistance to deformation of said means and the friction developed at the point of contact pressure.

EARL G. GUNN.